US009582967B2

(12) United States Patent
Meyer

(10) Patent No.: US 9,582,967 B2
(45) **Date of Patent: *Feb. 28, 2017**

(54) ELECTRONIC GAMING MACHINE AND GAMING METHOD

(71) Applicant: Ainsworth Game Technology Limited, Newington (AU)

(72) Inventor: Jason Meyer, Abbotsford (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,575

(22) Filed: Feb. 29, 2016

(65) Prior Publication Data

US 2016/0180650 A1 Jun. 23, 2016

Related U.S. Application Data

(63) Continuation of application No. 13/784,771, filed on Mar. 4, 2013, now Pat. No. 9,311,787.

(30) Foreign Application Priority Data

Mar. 6, 2012 (AU) ................................ 2012900882

(51) Int. Cl.
*A63F 13/00* (2014.01)
*G07F 17/32* (2006.01)
*G07F 17/34* (2006.01)

(52) U.S. Cl.
CPC ........ *G07F 17/3267* (2013.01); *G07F 17/323* (2013.01); *G07F 17/3211* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 5,788,573 | A | 8/1998 | Baerlocher et al. | |
| 7,216,867 | B1 | 5/2007 | Luciano et al. | |
| 7,819,741 | B1 | 10/2010 | Luciano | |
| 8,262,460 | B2 | 9/2012 | Mattice et al. | |
| 2002/0193158 | A1* | 12/2002 | Weiss | G07F 17/32 463/16 |
| 2004/0053660 | A1 | 3/2004 | Webb et al. | |
| 2005/0070353 | A1* | 3/2005 | Webb | G07F 17/32 463/16 |
| 2006/0142077 | A1* | 6/2006 | Miles | G07F 17/32 463/20 |
| 2007/0117610 | A1 | 5/2007 | Webb et al. | |
| 2010/0004049 | A1 | 1/2010 | Ching et al. | |
| 2012/0015707 | A1 | 1/2012 | Hornik et al. | |
| 2012/0122545 | A1 | 5/2012 | Watniks et al. | |

* cited by examiner

*Primary Examiner* — Jason Yen
(74) *Attorney, Agent, or Firm* — Cook Alex Ltd.

(57) ABSTRACT

An electronic gaming machine includes a display for displaying a first array of game symbols for playing a game and two or more second arrays of game enhancing elements, said second arrays being associated with columns of said first array. In response to a trigger event occurring in the columns, the second arrays each randomly award one or more game enhancing elements. A gaming method is also provided.

19 Claims, 11 Drawing Sheets

ELECTRONIC GAMING MACHINE AND GAMING METHOD

FIELD

The present invention relates to an electronic gaming machine and in a particular an electronic gaming machine using a primary game and a secondary bonus game. The invention has been developed primarily for use as an electronic gaming machine and will be described hereinafter by reference to this application.

BACKGROUND

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

In an electronic gaming machine, the mechanical reels are replaced with video images of the reels, which are displayed on a video display screen. The electronic gaming machine has an internal electronic game controller, typically a computer, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played.

Another type of gaming machine employs are "wheel"-type game concept where a wheel is divided into segments that award a variety of prizes, such as bonus prizes, multipliers, progressive prizes and even free games, as well as non-winning outcomes, such as "bankruptcy" or "lose". In operation, the wheel spins and the pointer or flipper indicates which segment is won by the player and the associated prize or non-winning outcome. This wheel concept has been extended to gaming machines that use multiple wheels in many different formats.

Bonus or "feature" games may also be provided in addition to the base or main game. Typically feature games use the same set of reels as the main game and are limited to a set of free games operated under a single set of rules. This means that the feature game is restricted by the same set of rules, and so there is no variation in the play of the feature game. Consequently, it is difficult to retain player interest because there is no apparent incentive for the player to continue playing the same electronic gaming machine once the player becomes familiar with the feature game and the main game. Also, it is difficult to retain player interest since there is little differentiation between gaming machines in terms of the main and feature games that are played.

It is an object of the present invention to overcome or substantially ameliorate one or more of the disadvantages of prior art, or at least to provide a useful alternative.

It is an object of the invention in at least one preferred form to provide a gaming machine and a method for controlling a gaming machine that encourages player interest.

SUMMARY

According to a first aspect of the invention, there is provided an electronic gaming machine comprising:

a display for displaying a first array of game symbols for playing a game, where the game symbols are arranged in two or more columns and predetermined winning combinations of randomly selected game symbols award prizes to a player, and an electronic game controller for controlling the display of game symbols on the display, wherein, said electronic game controller causes the display of two or more second arrays of game enhancing elements, said second arrays being associated with said columns of said first array, and wherein in response to a trigger event occurring in said columns, said electronic game controller causes said second arrays to each randomly award one or more game enhancing elements, said game enhancing elements simultaneously modifying one or more subsequent games played on the first array.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Preferably, each second array is individually associated with each column of the first array. That is, there is a corresponding second array for each column in said first array. More preferably, said first array comprises at least five columns and said second arrays comprise five second arrays, with a corresponding second array for each column.

Preferably, the association of said second arrays to said columns is visually indicated on the display. In one preferred form, the association is visually indicated by allocating a specific color to each column and its associated second array. In another preferred form, each column and its associated second array are in close proximity to or visually linked to each other to indicate their association.

Preferably, the trigger event comprises an in-game event during play of the game on the first array. More preferably, the trigger event comprises the appearance of at least one trigger symbol in each of said columns of the first array. The trigger event in another preferred form comprises a predetermined number of trigger symbols appearing in each of said at least two columns of the first array. In a further preferred form, trigger symbols appearing in said columns trigger activation of the second arrays associated with said columns.

Preferably, the game enhancing elements comprise at least one or more of a predetermined number of free games, a win multiplier, wild multipliers, bonus wilds, symbols that cause the award of additional free games, trigger symbols to retrigger said at least two second arrays, held columns, random wild symbols, progressives, bonus credits, jackpot symbols, and one or more symbol replacements. Held columns or reels typically involve the column or reel to only display wild card symbols, thus enhancing the probability of achieving a predetermined combination. Jackpot symbols typically award a jackpot prize after accumulating a predetermined number of jackpot symbols over a number of games that are played. Progressives operate in a similar manner to jackpot symbols in that a prize is awarded upon a certain number of progressive symbols are accumulated by the player over a number of games played on the gaming machine.

Preferably, each second array awards at least one different game enhancing element to the other second arrays. More preferably, each second array awards different game enhancing elements to the other second arrays.

Preferably, said second arrays are in the form of a circular, triangular, oval, semi-circular or other non-rectangular shape. In one preferred form, said second arrays take the form of circular wheels. Alternatively, said second arrays take the form of visibly rotatable reels.

Preferably, said game enhancing elements modify a predetermined number of said subsequent games played on the first array. More preferably, said predetermined number of subsequent games is played sequentially on the first array. Alternatively, said predetermined number of subsequent games is selectively played on the first array. In this alternative form, the electronic game controller or the player may select which subsequent games are modified by said game enhancing elements.

Preferably, at least one of said second arrays awards two or more game enhancing elements. More preferably, said second arrays award two or more game enhancing elements.

Preferably, said predetermined number of subsequent games comprises free games. Alternatively, said predetermined number of subsequent games comprises games on which the player wages a monetary amount. In another preferred form, said predetermined number of subsequent games comprises a combination of free games and games on which the player wages a monetary amount.

Preferably, said predetermined number of subsequent games comprises games on said first array. Alternatively, said predetermined number of subsequent games comprises feature games.

Preferably, said first array comprises N columns and N-M columns have corresponding second arrays, where $N\geq 2$ and $1\leq M\leq N-2$.

Preferably, the gaming machine further comprises a third array that is associated with all of the columns of said first array. More preferably, said third array is activated by the appearance of a predetermined number of trigger symbols appearing in any of the columns of said first array. The trigger symbols for the third array may the different to the triggers symbols for said second arrays.

Preferably, said electronic game controller causes display of said first array and said second arrays during play of a game on said first array. In this preferred form, the change in said second arrays from being inactive to being active may be indicated on the display. Alternatively, said electronic game controller causes the display of said second arrays in response to said trigger event.

Preferably, said electronic game controller causes the display of said second arrays on a separate display to said display. Alternatively, said electronic game controller causes the display of said second arrays with said first array on the same display.

Preferably, the player selectively starts and/or stops play of one or more of said second arrays.

According to a second aspect of the invention, there is provided a gaming method for an electronic gaming machine comprising a display and an electronic game controller, the method comprising the steps of:

controllably displaying a first array of game symbols on said display for playing a game, where the game symbols are arranged in two or more columns and predetermined winning combinations of randomly selected game symbols award prizes to a player, and the display of two or more second arrays of game enhancing elements;

associating said second arrays with said columns of said first array, and in response to a trigger event occurring in said columns, causing said second arrays to each randomly award one or more game enhancing elements, and simultaneously applying said game enhancing elements to modify one or more subsequent games played on the first array.

Preferably, said associating step comprises individually associating each of said second arrays with each column. More preferably, said first array comprises at least five columns and said second arrays comprise five second arrays, and said associating step further comprises associating a corresponding second array for each column.

Preferably, said associating step further comprises visually indicating said association of said second arrays to said columns on said display. More preferably, said association is visually indicated by allocating a specific color to each column and its associated second array. In one preferred form, said association is visually indicated by each column and its associated second array being in close proximity to or visually linked to each other.

Preferably, said trigger event comprises an in-game event during play of the game on the first array. More preferably, said trigger event comprises the appearance of one or more trigger symbols in said columns, and wherein said method further comprises activating the second arrays associated with said columns in response to said trigger event.

Preferably, said method further comprises each second array awarding at least one different game enhancing element to the other second arrays. More preferably, said method further comprises providing said second arrays in the form of a circular, triangular, oval, semi-circular or other non-rectangular shape. In one preferred form, said second arrays take the form of circular wheels.

Preferably, said method further comprises said game enhancing elements modifying a predetermined number of said subsequent games played on said first array. More preferably, said method further comprises playing said predetermined number of subsequent games sequentially on said first array.

Preferably, said method further comprises at least one of said second arrays awarding two or more game enhancing elements. More preferably, said method further comprises providing said predetermined number of subsequent games as games on said first array.

Preferably, said method further comprises forming said first array with N columns and providing said second arrays such that N-M columns of said first array have corresponding second arrays, where $N\geq 2$ and $1\leq M\leq N-2$.

Preferably, said method further comprises providing a third array that is associated with all of the columns of said first array. More preferably, said method further comprises activating said third array in response to the appearance of a predetermined number of trigger symbols appearing in any of the columns of said first array.

Preferably, said displaying step comprises displaying said first array and said second arrays during play of a game on said first array. In this preferred form, the change in said second arrays from being inactive to being active may be indicated on the display. Alternatively, displaying step comprises displaying said second arrays in response to said trigger event.

Preferably, said method further comprises permitting said player to selectively start and/or stop play of one or more of said second arrays.

Preferably, said method further comprises displaying said second arrays on a separate display to said display. Alternatively, said method further comprises displaying said second arrays with said first array on the same display.

The method also preferably has the preferred features of the first aspect of the invention not otherwise mentioned above.

According to a third aspect of the invention, there is provided a computer system comprising a central processing unit configured for communication with an electronic gaming machine, wherein said computer system is configured to perform the method of the second aspect of the invention.

According to a fourth aspect of the invention, there is provided a computer program configured to perform the method of the second aspect of the invention.

According to a fifth aspect of the invention, there is provided a non-transitive carrier medium carrying computer executable code that, when executed on a central processing unit configured for communication with an electronic gaming machine, causes the central processing unit to perform the method of the second aspect of the invention.

BRIEF DESCRIPTION OF THE DRAWINGS

Preferred embodiments of the invention will now be described, by way of example only, with reference to the accompanying drawings in which.

DETAILED DESCRIPTION OF THE EMBODIMENTS

Figure 1:
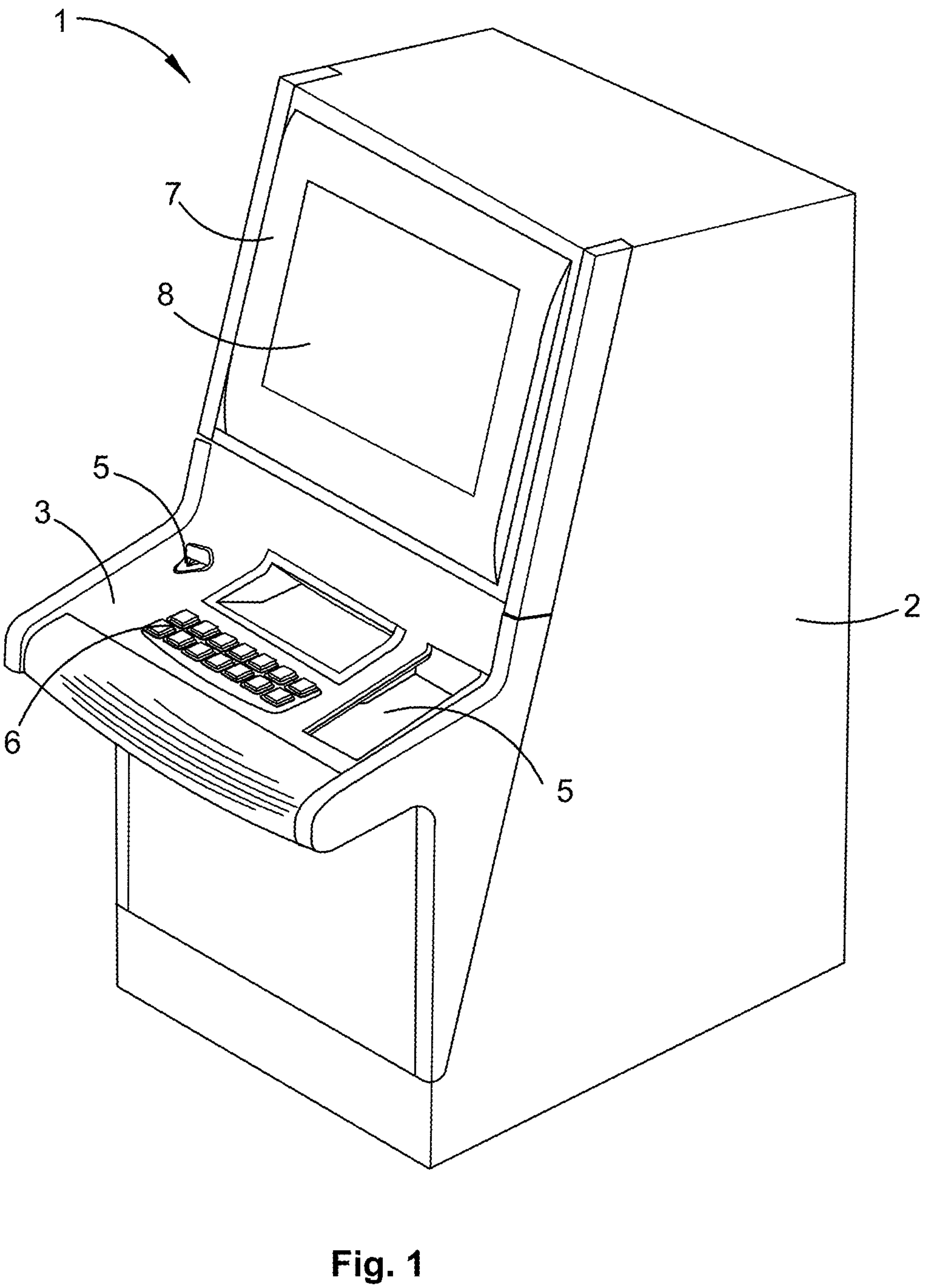
FIG. 1 is a perspective view of a gaming machine according to a first embodiment of the invention.
Figure 2:
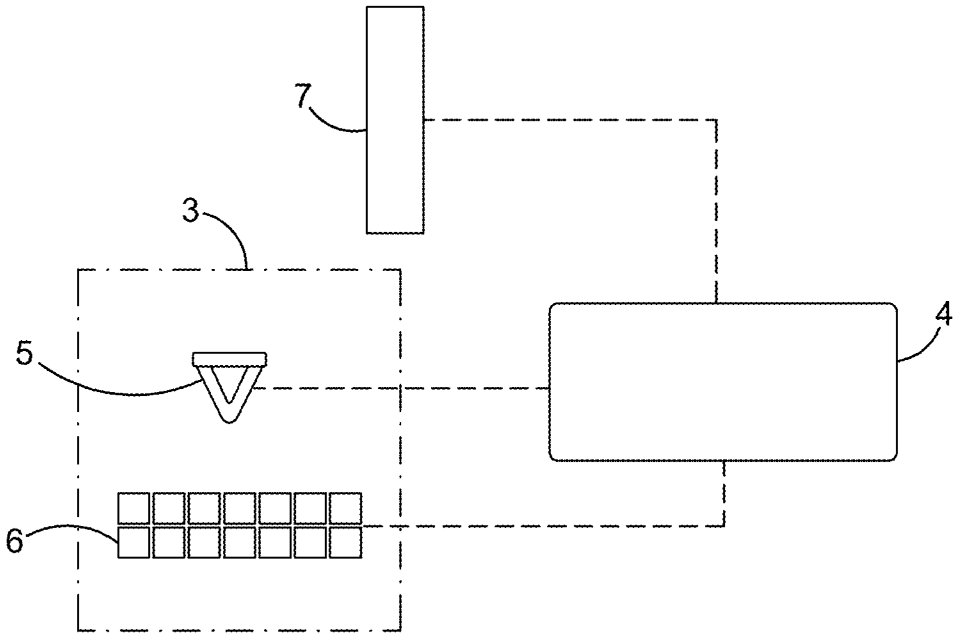
FIG. 2 is a schematic drawing of an electronic game controller for the electronic gaming machine of FIG. 1.

Referring to FIG. 1, an electronic gaming machine 1 according to a first embodiment of the invention includes a cabinet 2, a console 3 and an internal electronic game controller 4. The console 3 includes vending slots 5 for receiving monetary bets and a plurality of buttons 6 for actuation by a player. The electronic game controller 4 is generally in the form of a central processing unit, such as a computer, and is in electronic communication with a display in the form of a video display screen 7, as well as various input devices on the console 3, as best shown in FIG. 2. It is also appreciated that a person skilled in the art would readily understand the location and use of the electronic game controller 4 in the electronic gaming machine 1.

A display in the form of a video screen 7 is used to display a first array 8 of game symbols 9 in the form of five columns or "reels" 10, two outer reels 10*a*, 10*b* having three rows and three inner reels 10*c*, 10*d*, 10*e* having four rows. The game symbols 9 typically include picture symbols, wild symbols, scatter symbols and card symbols.

A separate top video screen 11 located above the main video screen 7 displays five semi-circular second arrays 12 of game enhancing elements in the form of eight pie-shaped segments 13, each indicating or describing the game enhancing element, such as "Held Reels", "×10 Multiplier" or "Jackpot". These game enhancing elements 13 are different in nature to the game symbols 9 on the first array as they are not combined with the game symbols 9 to form winning combinations but are used to modify play of the games on the first array 8. In other words, the game enhancing elements 13 exclude the game symbols 9 used in the first array 8. The second arrays 12 represent wheels partially shown on the video screen 11 so as to display only four segments 13 at a time.

The electronic game controller 4 controls the display of the first array 8 and the second arrays 12. During play of a game on the first array 8 and in response to a trigger event, the electronic game controller 4 causes the second arrays 12 to each randomly award one or more game enhancing elements 12, the game enhancing elements simultaneously modifying one or more subsequent games played on the first array 8.

While the first array 8 is arranged with five columns or "reels" 10 and an uneven number of rows, it will be appreciated by one skilled in the art that other arrays could be used, such as the industry standard 5×3 or 3×3, 4×3, 5×5, 4×4, etc. The first array 8 defines predetermined game positions or "squares" 14. The visible array 8 is arranged so that a player can select one or more predetermined "pay lines" 15 defined around the array, which correspond to combinations of the game positions 14. The pay lines 15 generally comprise at least one game position 14 from each reel 10. The number of pay lines 15 that can be selected by the player depends on the amount of the monetary bet for playing a game on the first array 8.

When a game is played, the controller 4 causes the reels 10 to appear to visibly rotate on the visible array 8 and randomly display the game symbols 9 in each game square 14. After the reels 12 stop spinning, the controller 4 determines whether there are any predetermined winning combinations of the game symbols 9 appearing in any player-selected pay lines 15, such as a two of a kind, three of a kind, four of a kind or five of a kind. It will be appreciated that other winning combinations of game symbols 9 can also be provided. If so, the gaming machine 1 enters a winning game state and awards a prize according to the displayed predetermined winning combination.

Figure 3:
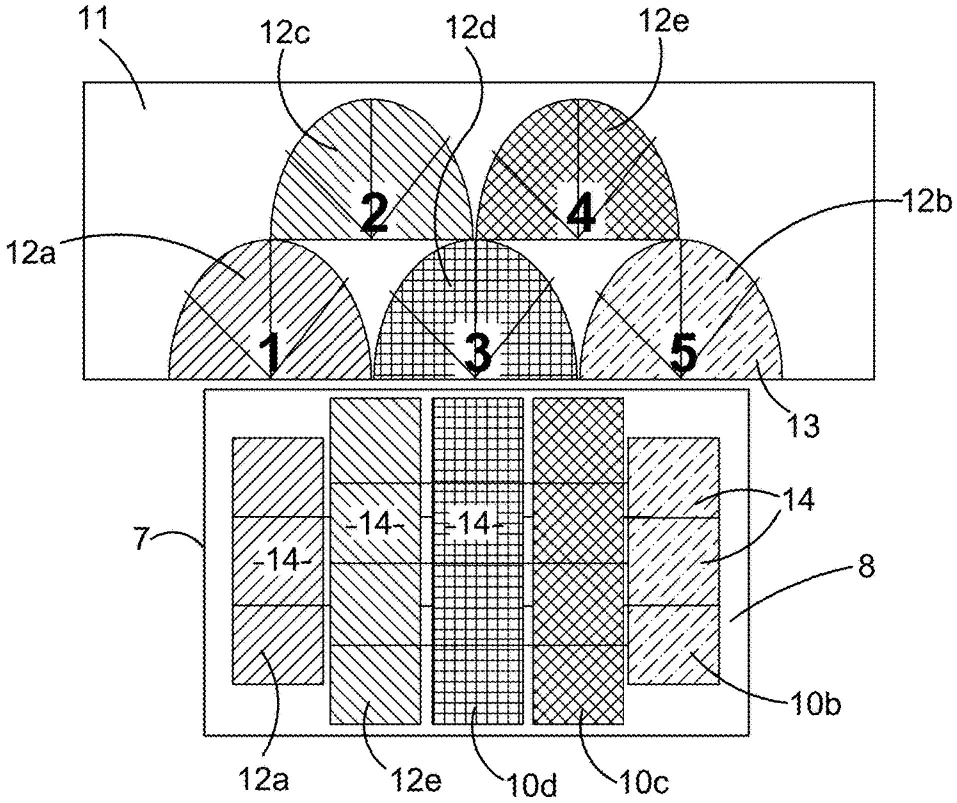
FIG. 3 is a schematic drawing of a display illustrating a game according to the first embodiment of the invention.

Each wheel 12 is associated with one of the reels 10. In this embodiment, the outer reel 10*a* is associated with the wheel 12*a*, the outer reel 10*b* is associated with the wheel 12*b*, the inner reel 10*c* is associated with the wheel 12*c*, the inner reel 10*d* is associated with the wheel 12*d* and the inner reel 10*e* is associated with the wheel 12*e*. This association is primarily indicated visually by way of color—the outer reel 10*a* and wheel 12*a* are red, the outer reel 10*b* and wheel 12*b* are green, the inner reel 10*c* and wheel 12*c* are blue, the inner reel 10*d* and wheel 12*d* are orange, and the inner reel 10*e* and wheel 12*e* are purple, as best shown in FIG. 3. Thus, there is a wheel associated with each reel 10 in the array 8. The association is also indicated by the relative proximity of each wheel 12 to its associated reel 10.

Also, once the wheels 12 are activated and the free games or spins are being played on the first array 8, "global" trigger symbols 17 may appear on any of the reels 10 during the free spins. Where at least three of the global trigger symbols 17 appear on any of the reels 10, then the player is award additional free spins on the first array 8. The number of trigger symbols 17 may be varied as required, as can the number of additional free spins that are awarded.

Figure 4:
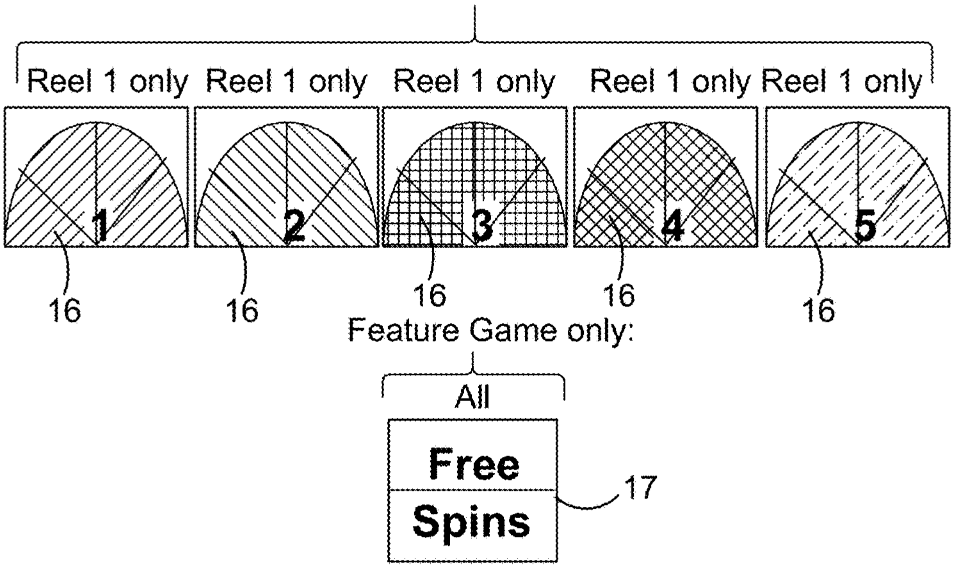
FIG. 4 is a schematic drawing illustrating trigger symbols for the game according to the first embodiment of the invention.

Initially, the wheels 12 are inactive and remain stationary until being activated by one or more trigger events. In this embodiment, the appearance of a trigger symbol in the form of a wheel scatter symbol 16 on the reels 10 causes activation of the wheel 12 associated with the reel upon which the trigger symbol has appeared, as best shown in FIG. 4. For example, if a wheel scatter symbol 16*a* appears on the outer reel 10*a*, this triggers the associated wheel 12*a* to activate. Likewise, corresponding wheel scatter symbols 16*b*, 16*c*, 16*d*, 16*e* appearing on their respective reels 10*b*, 10*c*, 10*d*, 10*e* causes activation of associated wheels 12*b*, 12*c*, 12*d*, 12*e*. The wheel scatter symbols 16 are confined to only appear on the reel 10 that would trigger activation of the associated wheel 12. Alternatively, wheel scatter symbols 16 of any type can appear on any of the reels 10, but only trigger activation of a wheel 12 when appearing on the correct reel.

Figure 5:
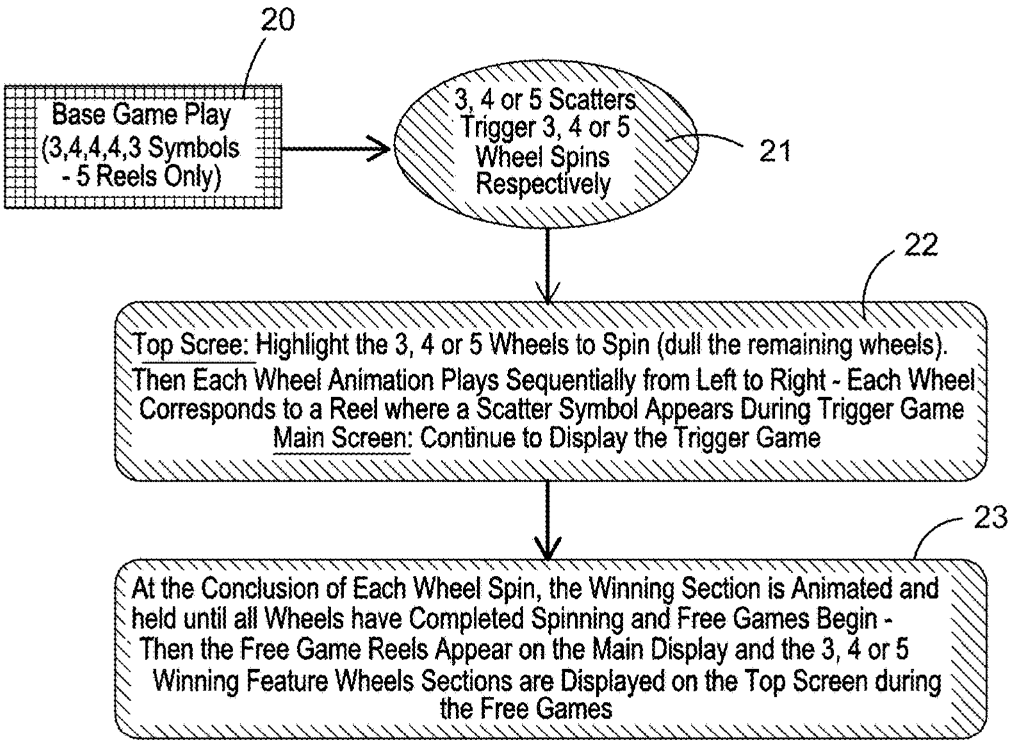
FIG. 5 is a schematic drawing illustrating operation of the trigger event in the game according to the first embodiment of the invention.

Referring to FIG. 5, operation of the reels 10 and wheels 12 are shown in a series of steps. At step 20, during play of a base or main game on the array 8, the appearance of three, four or five wheel trigger symbols 16 on reels 10 at step 21 activates the wheels 12 associated with those wheel trigger symbols to each spin. As indicated in step 22, the activated wheels are highlighted and spin, whilst the inactive wheels remain dull. The activated wheels spin sequentially from the leftmost activated wheel to the right. At step 23, at the end of the spin of each wheel, each segment 13 and its game enhancing element awarded to the player is highlighted and remains on display on the top video screen 11 during play of the bonus or feature game(s) on the main screen 7 that follow after the activated wheels 12 complete their spins.

Figure 6:
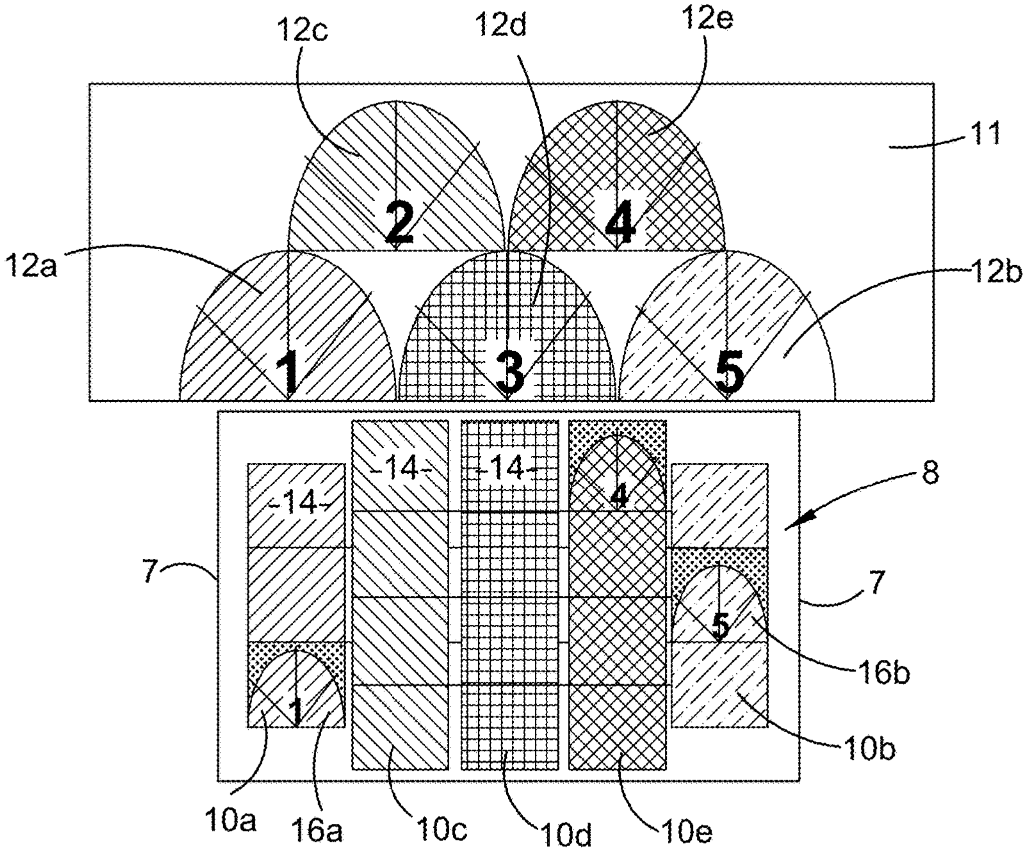
FIGS. 6 to 12 are schematic drawings illustrating operation of the first embodiment of the invention.
Figure 7:
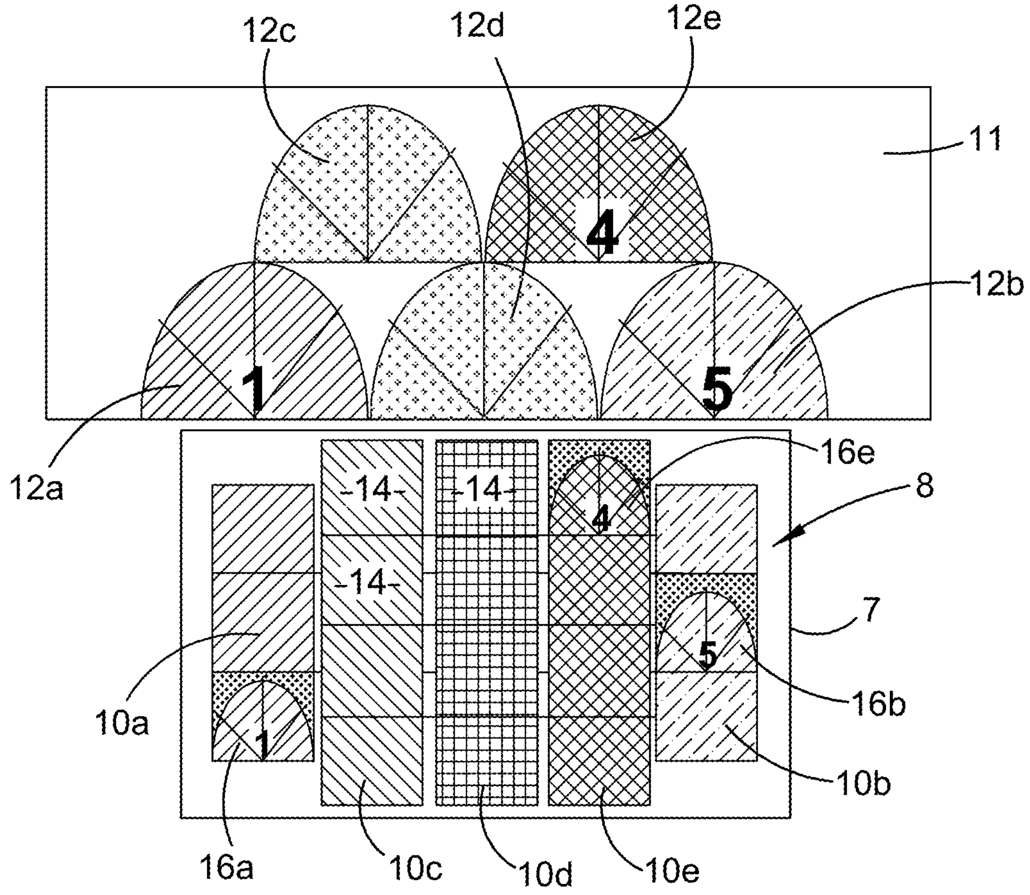

Operation of the embodiment of the invention will now be described in more detail with reference to an example, best shown in FIGS. 6 to 12. At the start of the game, all the wheels 16 on the top screen 11 are highlighted or lit up to indicate to the player of their potential to be triggered. During play of a game on the array 8 on the primary screen 7, wheel scatter symbols 16*a*, 16*b*, 16*e* appear on their respective reels 10*a*, 10*b*, 10*e*, as best shown in FIG. 6. Their corresponding wheels 12*a*, 12*b* and 12*e* on top screen 11 are activated, which is indicated by highlighting these wheels, whereas inactive wheels 12*c* and 12*d* dulled to indicate their inactive status, as best shown in FIG. 7.

Figure 8:
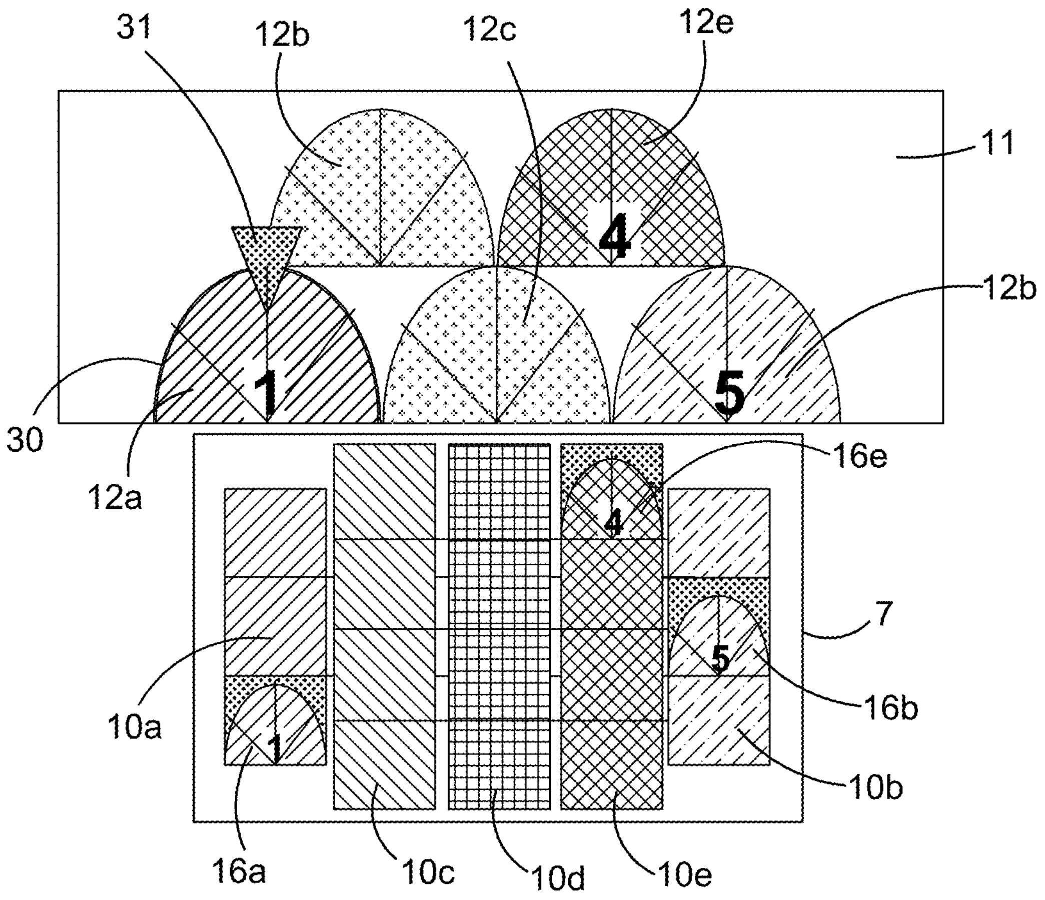
Figure 9:
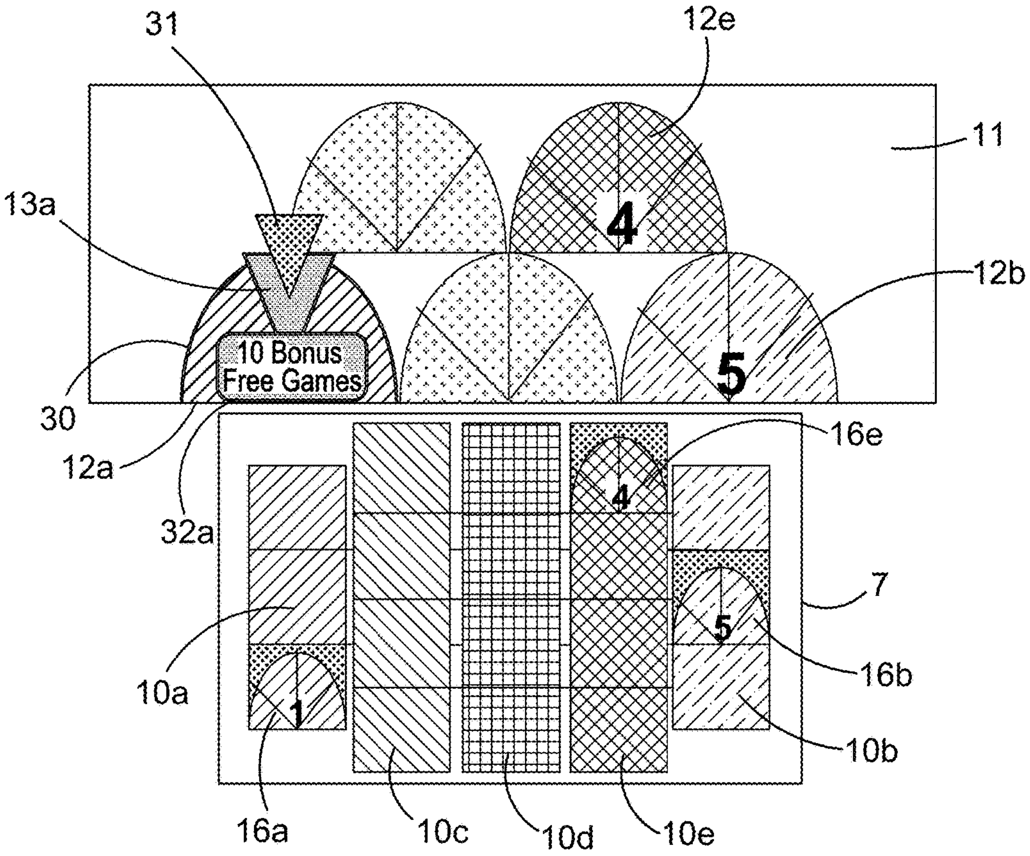

As best shown in FIG. 8, the leftmost wheel 12*a* is further highlighted by way of a brightly illuminated border or outline 30 and a pointer 31 appears to indicate to the player which game enhancing element indicated by the segment 13 is awarded when the wheel 12*a* stops spinning. The wheel 12*a* then spins, rotating each of its segments 13 through the pointer 31. When the wheel 12*a* stops, then the segment 13*a* located at the pointer 31 is highlighted in a similar manner and a text box 32*a* appears more clearly stating the game enhancing element that is awarded to the player, as best shown in FIG. 9. In this case, the game enhancing element is the award of 10 free bonus games. After awarding the first game enhancing element, the awarded segment 13*a* and its text box 32*a* remain highlighted while the other activated wheels 12*b*, 12*e* spin.

Figure 10:
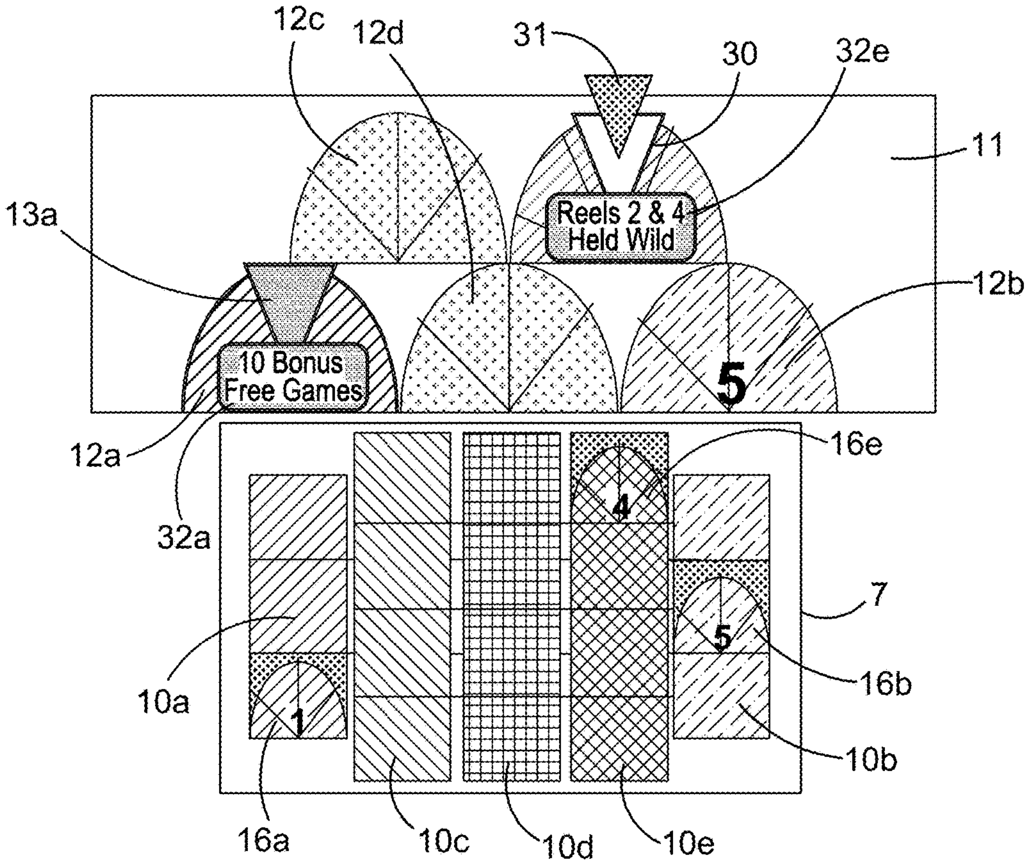

The next wheel 12*e* is then further highlighted by a bright outline 30 and the pointer 31 moves to the wheel 12*e* to indicate the winning segment when the wheel stops. Once the wheel 12*e* completes spinning as described above and stops, the resulting game enhancing element indicated by segment 13*e* at the pointer 31 being awarded to the player, as best shown in FIG. 10. In this case, the game enhancing element indicated by segment 13*e* is that reels 10*b*, 10*e* are held "wild", as stated in text box 32*b*. This means that the symbols on reels 10*b*, 10*e* are treated as wild symbols that can substitute for any other game symbol, thus increasing the chances of obtaining a winning combination of game symbols 9 on the first array 8. Again, the awarded segment 13*e* and its text box 32*e* on wheel 12*e* remain highlighted with the previously highlighted segment 13*a* and its text box 32*a* on wheel 12*a* while the final activated wheel 12*b* spins.

Figure 11:
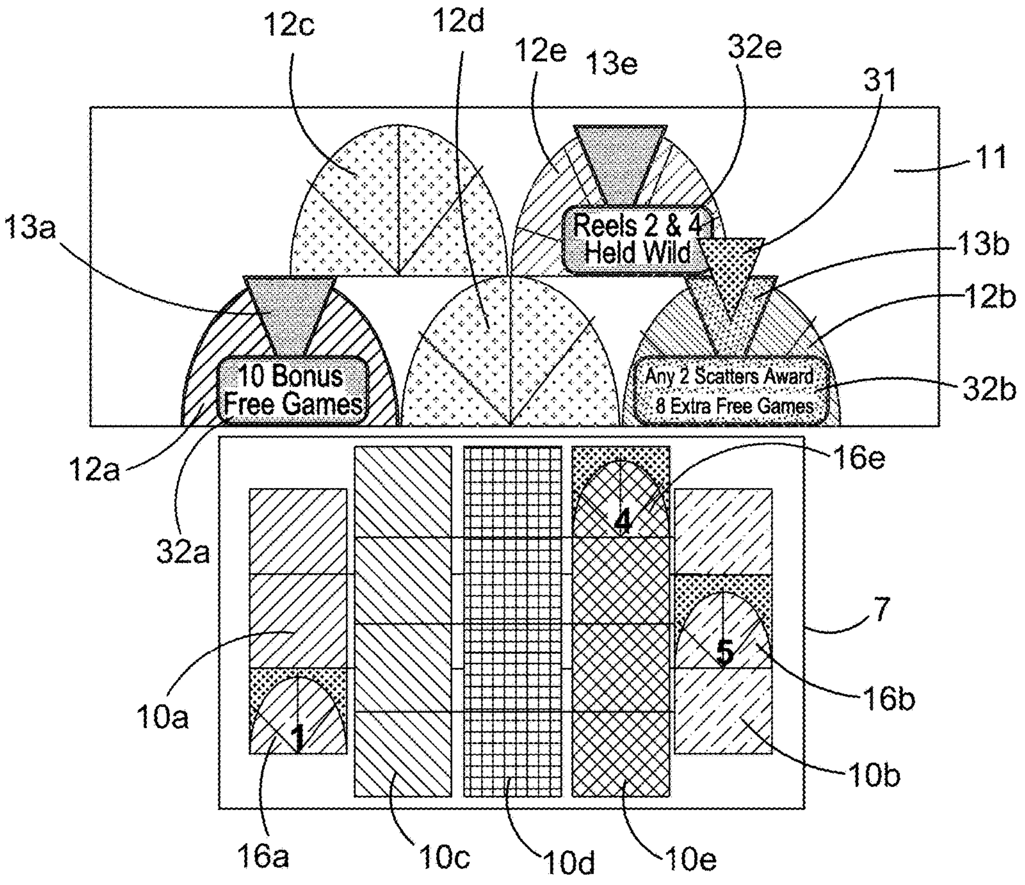

The final wheel 12*b* is then highlighted by a bright outline 30 and the pointer 31 again moves to the wheel 12*b* to indicate the winning segment 13 when the wheel stops. The wheel 12*b* spins and stops, resulting in the game enhancing element indicated by segment 13*b* at the pointer 31 being awarded to the player, as best shown in FIG. 11. In this case, the game enhancing element indicated by segment 13*b* is that any two scatter symbols appearing on the reels 10 of the first array 8 award eight extra free games.

Figure 12:
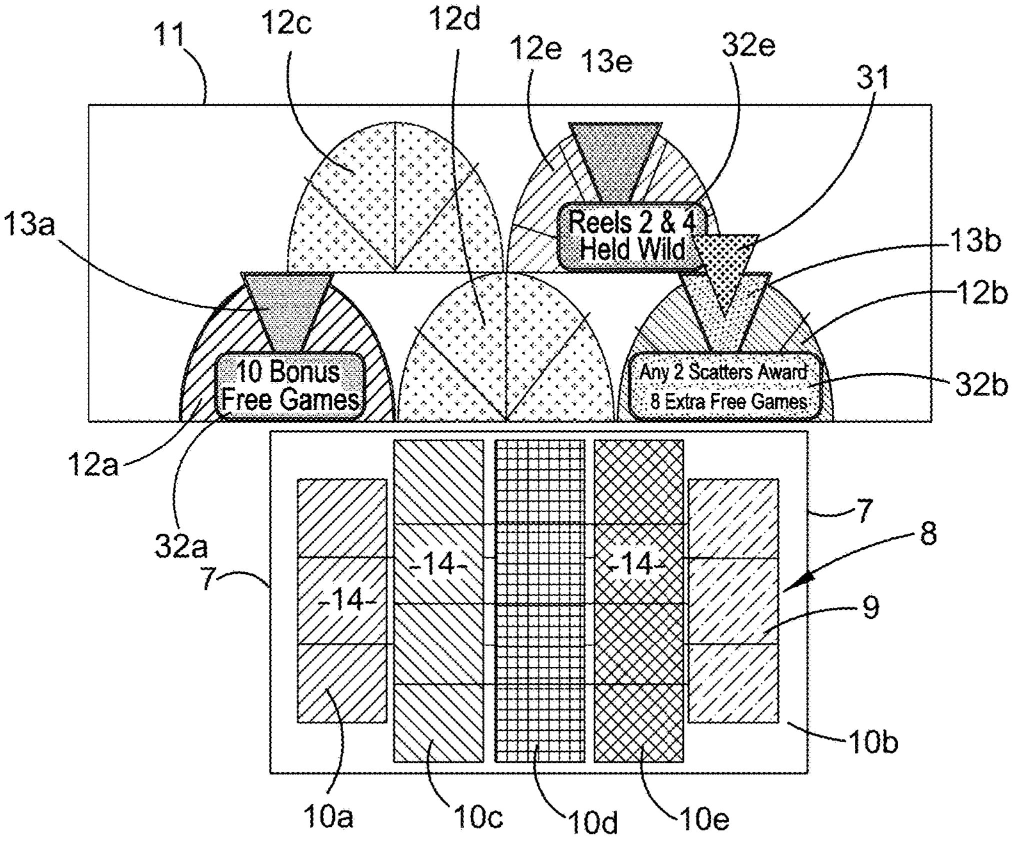

Once all the activated wheels 12 have completed their spins, the electronic game controller 4 then implements each of the game enhancing elements that have been awarded by the wheels 12. In the case of this example, the electronic game controller 4 causes the play of 10 free games or spins on the reels 10, as awarded by the segment 13*a* on wheel 12*a*. At the same time, the electronic game controller 4 modifies the rules of the free games by letting all the symbols of reels 10*b*, 10*e* be "wild" (as per the game enhancing element awarded by segment 13*e* on wheel 12*e*) and conferring 3 extra free spins whenever any two scatter symbols appear on the reels 10 (as per the game enhancing element awarded by segment 13*b* on wheel 12*b*). The display of the wheels 12 and awarded game enhancing elements by segments 13*a*, 13*b*, 13*c* remain unchanged during play of the free spins to show the player the game enhancing elements in effect, as best shown in FIG. 12. Also, the free games or spins awarded to the player under the modified rules use different game symbols to those used in the main game played on the array 8 to further emphasise the differences between the main game and the feature game.

It is contemplated that the wheels 12 each offer at least one different game enhancing element compared to the other wheels. For example, wheel 12*a* may award more free games, wheel 12*b* may award a global free game multiplier (that is, multiply the number of any free games that have been awarded), wheel 12*c* may award a wild multiplier (that is, multiply the number of credits won for any winning combination using a wild symbol), wheel 12*d* may award a predetermined number of reels on which additional wild symbols are displayed and wheel 12*e* may award bonus prizes or extra retriggered free games. However, it will be appreciated that the wheels 12 can be configured to award any number of game enhancing elements.

It can be seen that the provision of arrays having game enhancing elements associated with the reels of the array enhances player excitement and anticipation, since the rules of subsequent game(s) played on the reels can vary in a random fashion. This unpredictable variety in game play increases the likelihood that a player will prefer to continue playing the same gaming machine.

While the preferred embodiment of the invention has been described in relation to a main game and a feature game, those skilled in the art will appreciate that the game enhancing elements can readily be applied to the main game in addition to a feature or bonus game. Alternatively, there is no feature or bonus game and instead the game enhancing elements modify the main game for a predetermined number of games played in the main game. These games may be free or require payment from the player.

Similarly, in another preferred form, the segments 13 may indicate the duration in which its game enhancing element is applied, such as a predetermined number of spins or a predetermined time period.

In one preferred form, the number of second arrays 12 is less than the number of reels in the first array 8 so as to increase the importance of certain reels in the first array 8. In this preferred form, ideally there are at least two second arrays 12 and at least one more column or reel in the first array than the number of second arrays 12.

In yet another preferred form, the second arrays 12 may spin more than once to confer more than one game enhancing element. In this case, each awarded game enhancing element may be displayed adjacent or is associated with its originating second array 12.

While the preferred embodiment uses different game symbols in the feature game to those used in the main game, it will be appreciated that the same game symbols can be used throughout the main game and the feature game.

Furthermore, in another variation, the player can selectively stop spinning of the wheels 12 to increase player interaction and provide the player with an opportunity to guess when a desired game enhancing element may appear in the pointer 31. Also, the player can start spinning of the wheels 12 to further enhance player interaction. Also, in a further preferred form, the player can selectively start and/or stop spinning of the reels 10 of the first array 8 to further increase player interaction.

In other preferred forms, the first array 8 and the second arrays 12 need not be displayed on separate screens 7 and 11. Instead, they may be displayed on a single screen. Also, the second arrays 12 may not appear for display until they are triggered by the appearance of the required number of trigger symbols on the first array 8.

In another preferred form, the number or bonus games awarded to the player may be linked to the number of wheels 12 that are activated instead of being reliant on being awarded as part of a spin of one of the wheels. For example, activating three wheels 12 may confer 5 free spins of the reels 10 in the bonus game, activating four wheels 12 may confer 10 free spins of the reels 10 in the bonus game, and activating five wheels 12 may confer 15 free spins of the reels 10 in the bonus game.

In yet another preferred form, the association of the second arrays 12 to their respective reels or columns 10 is visually indicated by having the second array 12 positioned above its associated reel 10 so that the linked second arrays and reels have an appearance similar to a lollipop. That is, the second array 12 is the "head" of the lollipop and its associated reel 10 is the shaft or handle of the lollipop. It is believed that this alternative arrangement further facilitates game play and increases interest by the player due to its unique appearance.

Other ways of visually indicating the association of the second arrays 12 to their respective reels 10 may be used. For example, there could be a visual link, such as a highlighted line, visually connecting or joining the second array 12 and its associated reels 10. Another example would be having the second arrays 12 in close proximity or adjacent to their respective reels 10.

In a further preferred form, there is a third array that is associated with all of the columns of said first array. This "global" third array would be activated whenever a specific global trigger symbol appears in any column of the first array. In one variation, the global third array is triggered by a specific combination of game symbols, such as for example 3, 4 or 5 scatter symbols. The third array would operate in a similar fashion to the second arrays, but only award specific game enhancing elements, such as triggering progressive prizes or awarding a multiplier for winning combinations of game symbols.

Also, jackpot symbols may be used in the second arrays 12 to lead to jackpot prizes being awarded during play of the subsequent games (feature or main games).

In a further embodiment, at least one or all of the second arrays 12 are reactivated upon the appearance of any of the trigger symbols 16 on the first array 8 during the free spins, so as to award one or more additional game enhancing elements. Thus, the second arrays 12 continue to award game enhancing elements to further enhance the free games. For example, trigger symbol **16*a* appearing on reel 10*a* would reactivate wheel 12*a*** so that it spins again and awards another game enhancing element that modifies the remaining free games.

In another preferred form, the screen 7 is a touch screen for use in addition to the player-actuatable buttons 6 so as to enable the player to select various features, such as making monetary bets for the game, initiating play of the game played on the first array 8 and responding to any messages or requests issued on the gaming machine by the electronic game controller 4. Similarly, the screen 11 may also be a touch screen for use in addition to the player-actuatable buttons 6. In this case, the player may control when the reels 10 and/or wheels 12 start spinning and stop spinning by simply touching the relevant reel 10 or wheel 12.

While the same game format is essentially used between the main game and the feature game, it will be appreciated that the game format may vary. For example, the feature game 8 may be a wheel-type game or a four reel game and the main game may be a standard five reel game. Similarly, the main and feature games may each have different game symbols, game rules and pay tables that are unique to each game.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during gameplay. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the electronic gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on an electronic gaming machine. In a further aspect, the invention includes a computer system configured comprising a central processing unit configured for communication with an electronic gaming machine to perform the invention. In a yet another aspect, the invention includes a non-transitive carrier medium carrying computer executable code that, when executed on a central processing unit configured for communication with an electronic gaming machine, causes said central processing unit to perform the invention. In this case, the non-transitive carrier medium includes an external hard drive, a memory device, including a memory card, smart card, a radio frequency identification (RFID) device, USB key, magnetic card or other electronic storage device.

It will further be appreciated that any of the features in the preferred embodiments of the invention can be combined together and are not necessarily applied in isolation from each other. For example, the feature of having a number of second arrays 12 is less than the number of reels in the first array 8 can be combined with the feature of the second arrays 12 spinning more than once to confer more than one game enhancing element.

By providing arrays having game enhancing elements associated with the reels on the array, the player's anticipation and excitement is heightened as combining reels and game enhancing arrays (the wheels in the preferred embodiment) in a certain way allows for hundreds and even thousands of unique game permutations. Thus, it is more likely that a player will retain interest in continuing to play the same gaming machine due to the variation in game play on the gaming machine. Furthermore, since the electronic game controller controls operation of the reels and the game enhancing arrays, the invention can be readily implemented to existing gaming machines and other gaming systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An electronic gaming machine comprising:

a display for displaying a first array of game symbols for playing a game, where the game symbols are arranged in two or more columns and predetermined winning combinations of randomly selected game symbols award prizes to a player, vending slots to receive physical monetary bets, and an electronic game controller in electronic communication with the display and the vending slots and adapted to control the display of game symbols on the display, to permit a player to select a number of pay lines depending on the amount of the monetary bet, and to award a prize if any predetermined winning combinations appear in a selected pay line during the game, wherein, said electronic game controller causes the display of two or more second arrays of game enhancing elements, said two or more second arrays being associated with said two or more columns of said first array, and wherein in response to a trigger event occurring in said two or more columns, said electronic game controller causes said two or more second arrays to each randomly award one or more game enhancing elements, said one or more game enhancing elements of one of the two or more second arrays selected from one of (i) free games, (ii) win multipliers, (iii) wild multipliers, (iv) bonus wilds, (v) symbols that cause the award of additional free games, (vi) trigger symbols to retrigger said at least two second arrays, (vii) held columns, (viii) random wild symbols, (ix) progressives, (x) bonus credits, (xi) jackpot symbols, and (xii) one or more symbol replacements, and said one or more game enhancing elements of another of the two or more second arrays selected from a different one of (i) to (xii), said game enhancing elements simultaneously modifying one or more subsequent games played on the first array, wherein said first array comprises at least three columns and said two or more second arrays comprise at least three second arrays, with a corresponding second array for each column, said one or more game enhancing elements of each array of the at least three second arrays selected from a different one of (i) to (xii).

2. The electronic gaming machine of claim 1, wherein each second array is individually associated with each column of the first array.

3. The electronic gaming machine of claim 1, wherein said association of said two or more second arrays to said two or more columns is visually indicated on said display.

4. The electronic gaming machine of claim 3, wherein said association is visually indicated by allocating a specific color to each column and its associated second array.

5. The electronic gaming machine of claim 3, wherein said association is visually indicated by each column and its associated second array being in close proximity to or visually linked to each other.

6. The electronic gaming machine of claim 1, wherein said trigger event comprises an in-game event during play of the game on the first array.

7. The electronic gaming machine of claim 6, wherein said trigger event comprises the appearance of one or more trigger symbols, and wherein said trigger symbols appearing in said two or more columns activate the two or more second arrays associated with said columns.

8. The electronic gaming machine of claim 1, wherein said two or more second arrays are in the form of a circular, triangular, oval, semi-circular or other non-rectangular shape.

9. The electronic gaming machine of claim 8, wherein said two or more second arrays take the form of circular wheels.

10. The electronic gaming machine of claim 1, wherein said game enhancing elements modify a predetermined number of said subsequent games played on said first array.

11. The electronic gaming machine of claim 10, wherein said predetermined number of subsequent games is played sequentially on the first array.

12. The electronic gaming machine of claim 1, wherein at least one of said two or more second arrays awards two or more game enhancing elements.

13. The electronic gaming machine of claim 1, wherein said predetermined number of subsequent games comprises games on said first array.

14. The electronic gaming machine of claim 1, further comprising a third array that is associated with all of the columns of said first array.

15. The electronic gaming machine of claim 14, wherein said third array is activated by the appearance of a predetermined number of trigger symbols appearing in any of the columns of said first array.

16. The electronic gaming machine of claim 1, wherein said electronic game controller causes display of said first array and said two or more second arrays during play of a game on said first array.

17. The electronic gaming machine of claim 16, wherein the change in said two or more second arrays from being inactive to being active is indicated on said display.

18. The electronic gaming machine of claim 1, wherein said player selectively starts, stops, or starts and stops play of one or more of said two or more second arrays.

19. The electronic gaming machine of claim 1, wherein said first array comprises at least five columns and said two or more second arrays comprise five second arrays, with a corresponding second array for each column, said one or more game enhancing elements of each array of the five second arrays selected from a different one of (i) to (xii).

* * * * *